United States Patent
Kwon

(10) Patent No.: US 11,824,240 B2
(45) Date of Patent: Nov. 21, 2023

(54) ENERGY SYSTEM USING BYPRODUCTS GENERATED FROM SEAWATER ELECTROLYZER

(71) Applicant: KWaterCraft Co., Ltd., Busan (KR)

(72) Inventor: Soon Pyo Kwon, Busan (KR)

(73) Assignee: KWATERCRAFT CO., LTD., Busan (KR)

( * ) Notice: Subject to any disclaimer, the term of this patent is extended or adjusted under 35 U.S.C. 154(b) by 128 days.

(21) Appl. No.: 17/447,472

(22) Filed: Sep. 13, 2021

(65) Prior Publication Data

US 2022/0209269 A1 Jun. 30, 2022

(30) Foreign Application Priority Data

Nov. 30, 2020 (KR) .................. 10-2020-0163626

(51) Int. Cl.
*H01M 8/0656* (2016.01)
*C25B 1/04* (2021.01)
(Continued)

(52) U.S. Cl.
CPC ............. *H01M 8/0656* (2013.01); *C01F 5/02* (2013.01); *C25B 1/04* (2013.01); *C25B 1/26* (2013.01);
(Continued)

(58) Field of Classification Search
CPC ........... H01M 8/0656; H01M 8/04201; H01M 16/003; C01F 5/02; C25B 1/04; C25B 1/26
See application file for complete search history.

(56) References Cited

U.S. PATENT DOCUMENTS

| 2008/0075987 A1* | 3/2008 | Kindler ............. H01M 8/04201 429/513 |
| 2009/0010837 A1* | 1/2009 | Yabe .......................... B01J 7/02 422/186.01 |

FOREIGN PATENT DOCUMENTS

| KR | 20100085336 A | * | 7/2010 | .......... H01M 8/0656 |
| KR | 101561925 B1 | * | 10/2015 | |
| KR | 10-1577525 A | | 12/2015 | |

OTHER PUBLICATIONS

English Translation of Baik reference.*
English Translation of Chung.*
Handbook of Energy Storage, Published 2019.*

* cited by examiner

*Primary Examiner* — Stewart A Fraser
(74) *Attorney, Agent, or Firm* — Boisbrun Hofman, PLLC

(57) ABSTRACT

Disclosed is a technique for capturing, refining and storing byproduct hydrogen generated by a seawater electrolyzer, using the byproduct hydrogen in an energy system, and producing high-purity magnesium oxide from alkali byproducts additionally produced after seawater electrolysis. An energy system 100 may include a seawater electrolyzer 110 generating a chlorine substance by electrolyzing seawater, a hydrogen storage unit 120 capturing, refining, and storing byproduct hydrogen generated in the electrolysis process by the seawater electrolyzer, a fuel cell 130 using, as fuel, the byproduct hydrogen stored in the hydrogen storage unit, an MgO acquisition unit 140 converting, into magnesium oxide, magnesium hydroxide additionally generated from the seawater in the seawater electrolyzer, a hydrogen capture pipe 150 having one side coupled to the seawater electrolyzer and other side coupled to the hydrogen storage unit and transferring the byproduct hydrogen from the seawater electrolyzer to the hydrogen storage unit.

8 Claims, 2 Drawing Sheets

(51) Int. Cl.
 *C25B 1/26* (2006.01)
 *H01M 8/04082* (2016.01)
 *H01M 16/00* (2006.01)
 *C01F 5/02* (2006.01)
(52) U.S. Cl.
 CPC ..... *H01M 8/04201* (2013.01); *H01M 16/003* (2013.01)

ENERGY SYSTEM USING BYPRODUCTS GENERATED FROM SEAWATER ELECTROLYZER

CROSS-REFERENCES TO RELATED APPLICATIONS

This application is based on and claims priority under 35 U.S.C. 119 to Korean Patent Application No. 10-2020-0163626, filed on Nov. 30, 2020 in the Korean intellectual property office, the disclosures of which are herein incorporated by reference in their entireties.

TECHNICAL FIELD

The present disclosure relates to a technique for capturing, refining and storing byproduct hydrogen generated by a seawater electrolyzer, using the byproduct hydrogen in an energy system, and producing high-purity magnesium oxide from alkali byproducts additionally produced after seawater electrolysis.

BACKGROUND OF THE INVENTION

In nuclear power generation and thermal power generation systems, in order to cool high-temperature water passing through a turbine or cool a heat exchanger, seawater is introduced, and waste cooling water having a temperature equal to or lower than that of surrounding seawater by a given temperature is discharged to the sea. In this case, a seawater inlet has an ideal condition in which adhesive marine organisms, such as fishes and shellfishes and seaweeds, grow. The marine organisms cause damage to the inner wall of seawater waterway or coolant intake equipment, thus reducing efficiency of a cooling water pump and operating efficiency of related equipment, such as a heat exchanger. In order to solve such problems, in nuclear power generation and thermal power generation systems, seawater electrolysis equipment is installed. The seawater electrolysis equipment is installed in a seawater inlet, and it produces sodium hypochlorite (NaOCl) (hereinafter referred to as a "chlorine substance") by electrolyzing sodium chloride (NaCl) in seawater and prevents adhesive marine organisms from growing related equipment, such as a pipe and the tube of the heat exchanger. In the seawater electrolysis equipment, DC power converted through a rectifier is coupled to a positive pole and a negative pole, and is made to pass through seawater. Accordingly, NaCl and $H_2O$ in the seawater are electrolyzed to produce Na, Cl, H and OH ions. At this time, Na and OH ions having a high reaction are bonded to produce sodium hydroxide (NaOH). Cl moves to the positive pole and produces chlorine gas ($Cl_2$). H moves to the negative pole and produces hydrogen gas ($H_2$). The generated sodium hydroxide (NaOH) reacts to chlorine ($Cl_2$) to produce a chlorine substance (NaOCl). A concentration of the chlorine substance may be adjusted by controlling the amount of electrolysis based on the amount of a DC current. In this case, the chlorine substance and byproduct hydrogen generated in the seawater electrolysis equipment are moved to a storage tank through a check valve and are discharged into the atmosphere.

According to reports by Ministry of Industry in 2015, in the electrolysis process of producing chlorine in the seawater electrolysis equipment of a power plant, hydrogen is generated as byproducts (i.e., byproduct hydrogen). A rate of hydrogen generated in the seawater electrolysis equipment of a power plant in 2010 was 420.0 $m^3$/hr, which corresponds to power of about 503 kW when the 420.0 $m^3$/hr was used in a fuel cell.

Seawater contains a large amount of magnesium and calcium and produces alkali metal oxides upon electrolysis. Considerable maintenance and repair expenses for processing the seawater are required. If impurities included in alkali metal oxides are removed and magnesium hydroxide is recovered, such expenses can be reduced, and produced magnesium hydroxide can be used as an energy source. In general, dissolved magnesium within seawater has a dissolved 2+ form, and has been precipitated and recovered in the form of magnesium hydroxide ($Mg(OH)_2$) having low solubility, which is obtained by adding slaked lime ($CaCO_3$) or dolomite ($MgCO_3.CaCO_3$), produced at high temperature, to seawater containing magnesium ions (Mg) of about 1300 ppm (mg/L). In addition, if $Ca(OH)_2$, NaOH, KOH, $NH_4OH$, $Na_2CO_3$, $K2CO_3$, etc. is directly added to seawater, dissolved magnesium is precipitated in a magnesium hydroxide form at pH 10 or more. However, the purity of magnesium extracted from seawater is about 95 to 97%, and major impurities, such as calcium, is coprecipitated in the form of $CaCO_3$ or $Ca(OH)_2$. Accordingly, there is a need for a technique capable of recovering magnesium oxide having a high purity of 99% or more.

PRIOR ART DOCUMENT

Patent Document (Patent Document 1) Korean Patent No. 1577525

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present invention provide a system for capturing and refining byproduct hydrogen generated by a seawater electrolyzer and using the byproduct hydrogen as an energy source, such as a fuel cell, without losing the byproduct hydrogen by discharging it into the atmosphere.

Furthermore, embodiments of the present invention provide an energy system including a high-capacity hydrogen storage device capable of storing hydrogen with a high density by using a hydrogen storage alloy having high hydrogen storage efficiency per volume.

Furthermore, embodiments of the present invention provide an energy system for reducing a treatment cost and improving operating efficiency of the seawater electrolyzer by obtaining high-purity magnesium oxide from alkali byproducts generated after a seawater electrolysis reaction.

In an embodiment, an energy system using byproducts generated by a seawater electrolyzer may include the seawater electrolyzer configured to generate a chlorine substance by electrolyzing seawater, a hydrogen storage unit configured to capture, refine, and store byproduct hydrogen generated in the electrolysis process by the seawater electrolyzer, a fuel cell configured to use, as fuel, the byproduct hydrogen stored in the hydrogen storage unit, and a magnesium oxide (MgO) acquisition unit configured to convert, into magnesium oxide, magnesium hydroxide additionally generated from the seawater in the seawater electrolyzer.

As described above, according to an embodiment of the present disclosure, hydrogen generated as byproducts from the seawater electrolyzer for producing chlorine can be used as an energy source, such as a fuel cell, without discarding the byproduct hydrogen by discharging the byproduct hydrogen into the atmosphere without any change.

Furthermore, according to an embodiment of the present disclosure, the seawater electrolyzer obtains magnesium oxide from alkali byproducts that are treated as impurities and require separate treatment expenses. Accordingly, byproduct treatment expenses can be reduced, and the obtained magnesium oxide can be used as resources.

Furthermore, according to an embodiment of the present disclosure, the hydrogen storage unit using a hydrogen storage alloy capable of storing hydrogen in a metal hydroxide form is provided. Accordingly, hydrogen can be stored with a higher volume than the volume of a conventional technology, and thus a site for the area of an energy system can be reduced.

Furthermore, according to an embodiment of the present disclosure, high-purity magnesium oxide can be obtained by purifying alkali byproducts, additionally generated in seawater electrolysis equipment and containing a large amount of impurities, through a pyrolytic reaction.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, embodiments of the present disclosure are described in detail with reference to the accompanying drawings. Embodiments of the present disclosure to be described hereinafter relate to an energy system, including a seawater electrolyzer, a hydrogen storage unit, a magnesium oxide (MgO) acquisition unit, and a fuel cell.

Figure 1:
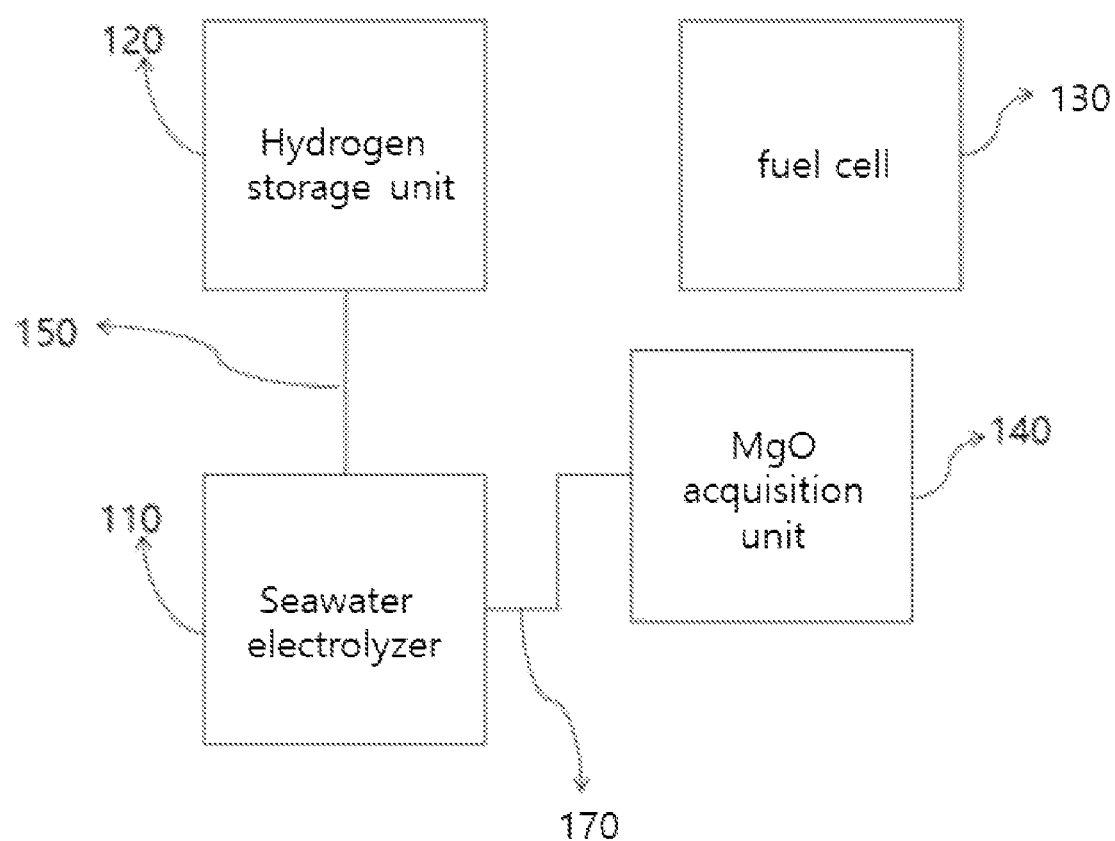
FIG. 1 is a diagram illustrating a structure of an energy system according to an embodiment of the present disclosure.

FIG. 1 is a diagram illustrating a structure of an energy system 100 according to an embodiment of the present disclosure. Referring to FIG. 1, the energy system 100 according to an embodiment of the present disclosure includes a seawater electrolyzer 110 for producing a chlorine substance by electrolyzing seawater, a hydrogen storage unit 120 for capturing, refining, and storing byproduct hydrogen generated in the electrolysis process by the seawater electrolyzer, a fuel cell 130 using, as fuel, the byproduct hydrogen stored in the hydrogen storage unit, and a magnesium oxide (MgO) acquisition unit 140 for converting, into magnesium oxide, magnesium hydroxide (Mg(OH)$_2$) additionally generated from the seawater in the seawater electrolyzer. The MgO acquisition unit 140 may convert the magnesium hydroxide (Mg(OH)2) into the magnesium oxide (MgO) through a pyrolytic reaction. For example, the pyrolytic reaction may be performed in a temperature of 350 to 450° C.

In an embodiment of the present disclosure, the seawater electrolyzer 110 generates a chlorine substance, such as chlorine, by electrolyzing seawater. Chlorine generated by electrolyzing seawater per one seawater electrolyzer module is 1,100 ppm. This may be represented as the number of moles per hour as follows.

NaOCl: 1,100 ppm (mg/L)*30 ton/hr=(33 kg/hr, Cl$_2$)/(1 mol/35 g)=1,155 mol/hr

Byproduct hydrogen generated as byproducts in a process of electrolyzing seawater is generated as the same number of moles as chlorine. The amount of byproduct hydrogen generated through seawater electrolysis per one seawater electrolyzer module is about H$_2$: 1,155 mol/hr*22.4 L/1M=26 m$^3$/hr. In an embodiment of the present disclosure, the same amount of byproduct hydrogen additionally generated as much as the amount of chlorine generated through seawater electrolysis can be captured, stored and provided as an energy source, such as a fuel cell, without discharging the byproduct hydrogen into the atmosphere. For example, in the case of a polyelectrolyte fuel cell (PEMFC), electricity of about 1 kW (AC) can be produced using hydrogen of 1 m$^3$/hr as fuel. Accordingly, an energy system according to an embodiment of the present disclosure can produce electricity of about 26 kW per hour through one seawater electrolyzer module.

In an embodiment of the present disclosure, the hydrogen storage unit 120 captures, refines and stores byproduct hydrogen generated by the seawater electrolyzer 110 through the electrolysis process of seawater, and can significantly reduce a storage volume by storing byproduct hydrogen in the form of metal hydroxide. In order to store byproduct hydrogen in the form of metal hydroxide, a hydrogen storage alloy may be used. The hydrogen storage alloy may be any one selected from LaNi$_3$BH$_3$, Li$_2$NH, LiNH$_2$—LiH, TiCl$_3$, Li$_2$O—Li$_3$N, Li$_2$MgN$_2$H$_2$, Li$_3$N, Li$_2$NH, Li$_3$BN$_2$H$_8$, and LiB$_4$—½MgH$_2$—2 mol % (or LiB$_4$—½MgH$_2$).

As the hydrogen storage alloy and the byproduct hydrogen reach to each other, metal hydroxide is generated and simultaneously heat occurs. The pressure of hydrogen gas may be lowered due to the generated heat. In this case, the pressure of the hydrogen gas may be raised by applying heat to the metal hydroxide so that the hydrogen gas is discharged. A difference between the lowered pressure and raised pressure of the hydrogen gas at this time may be converted into motive power for driving the fuel cell to be described later.

In an embodiment of the present disclosure, the fuel cell 130 uses, as fuel, byproduct hydrogen stored in the hydrogen storage unit 120. Oxygen is supplied to the cathode of the fuel cell 130, and the byproduct hydrogen is supplied to the fuel pole of the fuel cell 130. As an electrochemical reaction occurs in the form of a reverse electrolysis reaction, electricity, heat, and water are generated, so that electrical energy can be produced with high efficiency while not causing pollution. In an embodiment of the present disclosure, the fuel cell 130 may systematically basically consist of a fuel cell stack for generating electrical energy, a fuel supply device for supplying fuel to the fuel cell stack, an air supply device for supplying the fuel cell stack with oxygen within the air, that is, an oxidant necessary for an electrochemical reaction, and a heat and water management device for removing reaction heat of the fuel cell stack toward the outside of the system and controlling an operating temperature of the fuel cell stack. For example, the fuel cell may be selected from a molten carbonate fuel cell (MCFC), a polyelectrolyte fuel cell (PEMFC), a solid oxide fuel cell (SOFC), a direct methanol fuel cell (DMFC), a direct ethanol fuel cell (DEFC), a phosphoric acid fuel cell (PAFC), and a direct carbon fuel cell (DCFC). Through such a construction, the fuel cell generates electricity by an electrochemical reaction between hydrogen, that is, fuel, and oxygen within the air, and discharges heat and water as reaction byproducts.

In an embodiment of the present disclosure, in the fuel cell 130, a given amount of byproduct hydrogen is supplied from the hydrogen repository 120, pumped by a compressor or blower for supplying hydrogen, and supplied to the fuel pole through the inlet of the fuel cell 130. At the same time, the air is supplied to the fuel cell and generates oxidation and reduction reactions along with the byproduct hydrogen supplied to the fuel pole, so that electrical energy is generated.

In an embodiment of the present disclosure, in order to transfer byproduct hydrogen by connecting the seawater electrolyzer 110 and the hydrogen storage unit 120, the energy system 100 of FIG. 1 may further include a hydrogen capture pipe 150 having one side coupled to the seawater electrolyzer 110 and the other side coupled to the hydrogen storage unit 120. Furthermore, the energy system 100 of FIG. 1 further includes a magnesium hydroxide transfer pipe 170 having one side coupled to the seawater electrolyzer 110 and the other side coupled to the MgO acquisition unit 140 and transferring magnesium hydroxide from the seawater electrolyzer 110 to the MgO acquisition unit 140.

Figure 2:
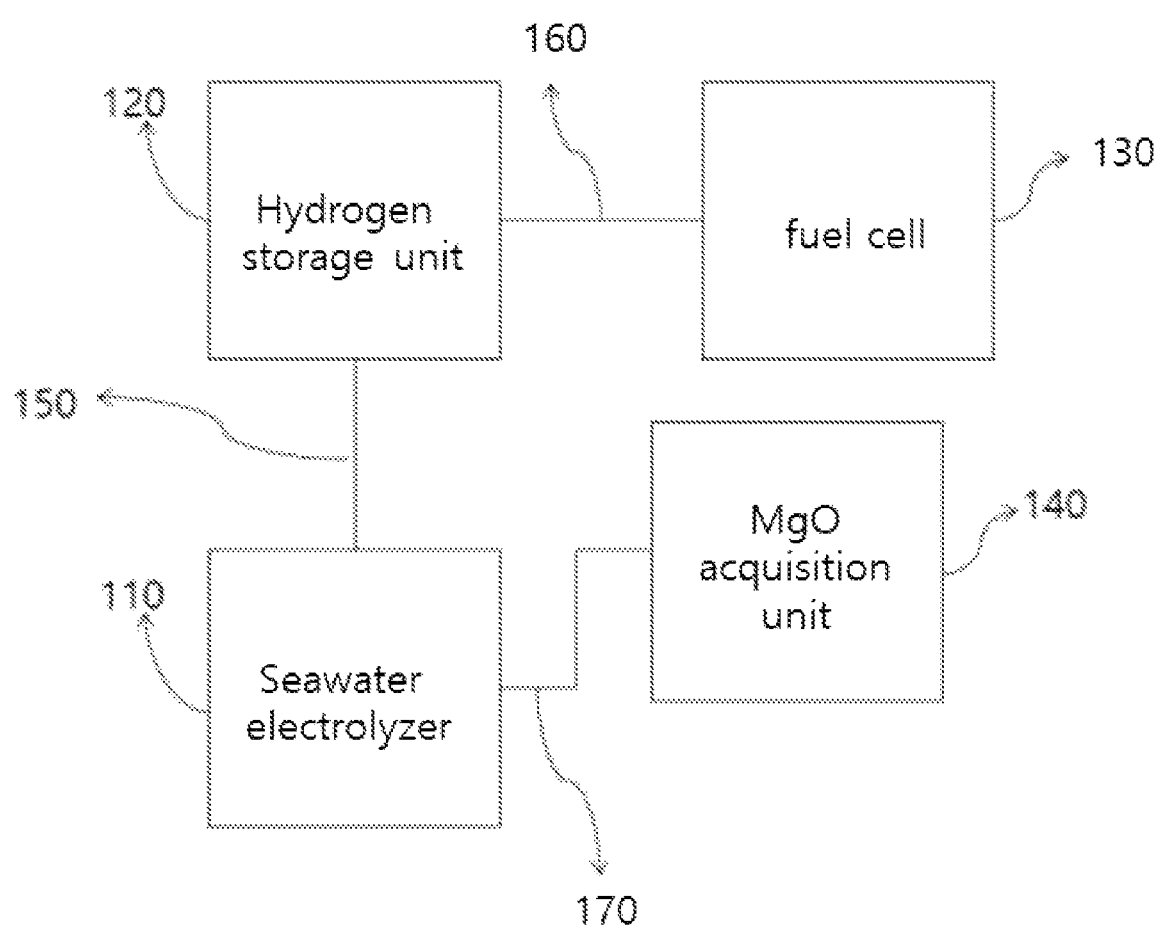
FIG. 2 is a diagram illustrating a structure of an energy system according to another embodiment of the present disclosure.

FIG. 2 is a diagram illustrating a structure of an energy system 100 according to another embodiment of the present disclosure. Referring to FIG. 2, the energy system 100 according to an embodiment of the present disclosure includes a seawater electrolyzer 110 for producing a chlorine substance by electrolyzing seawater, a hydrogen storage unit 120 for capturing, refining, and storing byproduct hydrogen generated in the electrolysis process by the seawater electrolyzer, a fuel cell 130 using, as fuel, the byproduct hydrogen stored in the hydrogen storage unit, a magnesium oxide (MgO) acquisition unit 140 for converting, into magnesium oxide, magnesium hydroxide (Mg(OH)$_2$) additionally generated from the seawater in the seawater electrolyzer, a hydrogen capture pipe 150 having one side coupled to the seawater electrolyzer 110 and the other side coupled to the hydrogen storage unit 120 and transferring the byproduct hydrogen, and a magnesium hydroxide transfer pipe 170 having one side coupled to the seawater electrolyzer 110 and the other side coupled to the MgO acquisition unit 140 and transferring magnesium hydroxide. Furthermore, the energy system 100 of FIG. 2 may further include a hydrogen supply pipe 160 having one side coupled to the hydrogen storage unit 120 and the other coupled to the fuel cell 130 in order to transfer the byproduct hydrogen from the hydrogen storage unit 120 to the fuel cell 130.

The preferred embodiments of the present disclosure have been described so far. A person having common knowledge in a technical field to which the present invention pertains will understand that the present invention may be implemented in a modified form without departing from an intrinsic characteristic of the present disclosure. Accordingly, the disclosed embodiments should be considered from a descriptive viewpoint not from a limitative viewpoint. The range of the present disclosure is described in the claims not the above description, and all differences within an equivalent range thereof should be construed as being included in the present disclosure.

DESCRIPTION OF REFERENCE NUMERAL

100: energy system
110: seawater electrolyzer
120: hydrogen storage unit
130: fuel cell
140: magnesium hydroxide acquisition unit
150: hydrogen capture pipe
160: hydrogen supply pipe
170: magnesium hydroxide transfer pipe The embodiments of the invention in which an exclusive property or privilege is claimed are defined as follows:

1. An energy system using byproducts generated by a seawater electrolyzer, comprising:
    the seawater electrolyzer configured to generate a chlorine substance by electrolyzing seawater;
    a hydrogen storage unit configured to capture, refine, and store byproduct hydrogen generated in the electrolysis process by the seawater electrolyzer;
    a fuel cell configured to use, as fuel, the byproduct hydrogen stored in the hydrogen storage unit; and
    a magnesium oxide (MgO) acquisition unit configured to:
        convert, into magnesium oxide, magnesium hydroxide (Mg(OH)$_2$) additionally generated from the seawater in the seawater electrolyzer; and
        convert the magnesium hydroxide into the magnesium oxide through a pyrolytic reaction, wherein the pyrolytic reaction is performed in a temperature of 350° C. to 450° C.

2. The energy system of claim 1, wherein the hydrogen storage unit stores the byproduct hydrogen in a metal hydroxide form.

3. The energy system of claim 1, wherein the hydrogen storage unit stores the byproduct hydrogen by using a hydrogen storage alloy.

4. The energy system of claim 3, wherein the hydrogen storage alloy is selected from LaNi$_3$BH$_3$, Li$_2$NH, LiNH$_2$—LiH, TiCl$_3$, Li$_2$O—Li$_3$N, Li$_2$MgN$_2$H$_2$, Li$_3$N, Li$_2$NH, Li$_3$BN$_2$H$_8$, and LiB$_4$—½MgH$_2$.

5. The energy system of claim 1, further comprising a hydrogen capture pipe configured to have one side coupled to the seawater electrolyzer and other side coupled to the hydrogen storage unit and to transfer the byproduct hydrogen from the seawater electrolyzer to the hydrogen storage unit.

6. The energy system of claim 1, further comprising a hydrogen supply pipe configured to have one side coupled to the hydrogen storage unit and other side connected to the fuel cell and to transfer the byproduct hydrogen from the hydrogen storage unit to the fuel cell.

7. The energy system of claim 1, further comprising a magnesium hydroxide transfer pipe configured to have one side coupled to the seawater electrolyzer and other side coupled to the MgO acquisition unit and to transfer the magnesium hydroxide from the seawater electrolyzer to the MgO acquisition unit.

8. The energy system of claim 1, wherein the fuel cell is selected from a molten carbonate fuel cell (MCFC), a polyelectrolyte fuel cell (PEMFC), a solid oxide fuel cell (SOFC), a direct methanol fuel cell (DMFC), a direct ethanol fuel cell (DEFC), a phosphoric acid fuel cell (PAFC), and a direct carbon fuel cell (DCFC).

\* \* \* \* \*